US009635950B2

(12) United States Patent
Saunders et al.

(10) Patent No.: US 9,635,950 B2
(45) Date of Patent: May 2, 2017

(54) DISPLAY DEVICE FOR A PLUNGER MATRIX MATTRESS

(71) Applicant: DREAMWELL, LTD., Las Vegas, NV (US)

(72) Inventors: Craig Saunders, Rocky River, OH (US); John E. Spirk, Gates Mills, OH (US); Lindsey Tufts-Junior, Eastlake, OH (US); William E. Rabbitt, Chesterland, OH (US); Gary R. Stephan, Seven Hills, OH (US)

(73) Assignee: DREAMWELL, LTD., Las Vegas, NV (US)

( * ) Notice: Subject to any disclaimer, the term of this patent is extended or adjusted under 35 U.S.C. 154(b) by 385 days.

(21) Appl. No.: 14/307,635

(22) Filed: Jun. 18, 2014

(65) Prior Publication Data

US 2014/0368660 A1 Dec. 18, 2014

Related U.S. Application Data

(60) Provisional application No. 61/836,385, filed on Jun. 18, 2013.

(51) Int. Cl.
*H04N 7/18* (2006.01)
*A47C 21/00* (2006.01)
*A47C 31/12* (2006.01)
*A47F 7/30* (2006.01)

(52) U.S. Cl.
CPC .......... *A47C 21/003* (2013.01); *A47C 31/123* (2013.01); *A47F 7/30* (2013.01); *H04N 7/18* (2013.01)

(58) Field of Classification Search
CPC ....... A47C 21/003; A47C 31/123; A47F 7/30; H04N 7/18
See application file for complete search history.

(56) References Cited

U.S. PATENT DOCUMENTS

| 5,206,733 A * | 4/1993 | Holdredge | A47B 23/007 348/836 |
| 8,458,042 B1 * | 6/2013 | Roberts | A47C 31/123 705/26.1 |
| 2001/0037509 A1 * | 11/2001 | Kligman | H04N 7/181 725/105 |

(Continued)

*Primary Examiner* — Jay Patel
*Assistant Examiner* — Joseph Suh
(74) *Attorney, Agent, or Firm* — Cantor Colburn LLP

(57) ABSTRACT

A point-of-sale demonstration system includes a display system for viewing the underside of the plunger matrix mattress allowing a person sitting or lying on the mattress to readily view the impression created by their body weight on the plungers. The display system includes a camera positioned to image the underside of the mattress and a monitor (display screen) positioned for viewing by a person lying on the mattress so that they can see the deflection in the bottom of the plungers caused by their own weight on the mattress. Seeing the image of the downwardly displaced plungers immediately conveys the operation of the plunger matrix mattress to the viewer. The system may also be configured to capture individual frames and video images, store the images, transmit the images, and edit as desired, for example by zooming, cropping, changing the speed of the video, and so forth.

18 Claims, 3 Drawing Sheets

(56) References Cited

U.S. PATENT DOCUMENTS

| | | | |
|---|---|---|---|
| 2003/0042772 A1* | 3/2003 | Park | A61B 1/00048 297/217.1 |
| 2003/0057323 A1* | 3/2003 | Keogh | A61G 3/00 244/118.5 |
| 2004/0262278 A1* | 12/2004 | Ciniglio | H05K 3/34 219/129 |
| 2005/0076439 A1* | 4/2005 | Khait | A61G 7/0005 5/600 |
| 2006/0170768 A1* | 8/2006 | Riley | H04N 7/181 348/143 |
| 2006/0225297 A1* | 10/2006 | Tadin | A61B 5/1074 33/515 |
| 2007/0009136 A1* | 1/2007 | Pawlenko | G06K 9/3241 382/104 |
| 2007/0058039 A1* | 3/2007 | Clark | A63H 33/006 348/143 |
| 2007/0159332 A1* | 7/2007 | Koblasz | G06F 19/3456 340/572.1 |
| 2008/0086815 A1* | 4/2008 | Kappeler | A61G 7/018 5/600 |
| 2008/0284846 A1* | 11/2008 | Al-Jasim | H04N 7/183 348/82 |
| 2009/0062693 A1* | 3/2009 | Woolfson | A61B 5/1077 600/587 |
| 2010/0005588 A1* | 1/2010 | Christopher | A47C 21/003 5/423 |
| 2010/0148399 A1* | 6/2010 | Gebert | B30B 11/14 264/299 |
| 2010/0201810 A1* | 8/2010 | Shimazaki | B60R 1/00 348/135 |
| 2011/0015495 A1* | 1/2011 | Dothie | G06F 19/322 600/300 |
| 2011/0137110 A1* | 6/2011 | Aarts | A61M 21/02 600/27 |
| 2011/0197727 A1* | 8/2011 | In 'T Veld | B28D 5/0082 83/23 |
| 2012/0075464 A1* | 3/2012 | Derenne | A61B 5/0013 348/135 |
| 2012/0286954 A1* | 11/2012 | Cullen | A61B 5/1113 340/540 |
| 2013/0148783 A1* | 6/2013 | Ikawa | G01N 23/04 378/62 |
| 2013/0340176 A1* | 12/2013 | Stevens | A61G 7/057 5/710 |
| 2014/0078301 A1* | 3/2014 | Fazzi | A61B 5/0059 348/143 |
| 2014/0137333 A1 | 5/2014 | DeFranks et al. | |
| 2015/0095189 A1* | 4/2015 | Dharssi | G07G 1/0063 705/26.8 |
| 2015/0143925 A1* | 5/2015 | Vandeparre | G01L 1/142 73/862.626 |

* cited by examiner

DISPLAY DEVICE FOR A PLUNGER MATRIX MATTRESS

REFERENCE TO RELATED APPLICATION

This application claims priority to U.S. Provisional Patent Application Ser. No. 61/836,385 entitled "Display Device for a Mattress Including Movable Pins" filed Jun. 18, 2013, which is incorporated by reference.

TECHNICAL FIELD

The present disclosure generally relates to point-of-sale demonstration systems for mattresses and, more particularly, to a mattress display system configured to show images of the underside of a plunger matrix mattress to a person, such as prospective purchaser, while the person is sitting or lying on the mattress.

BACKGROUND

Buyers of consumer or business products such as mattresses can become overwhelmed with data as they consider product choices. Bedding sellers, in particular, may have a wide variety of products with a wide range of options and performance characteristics to demonstrate and explain to customers. Typically, a prospective purchaser will analyze some portion of the available data, such as comparing product features in a convenient format, asking friends, speaking to sales persons, or reading expert reviews. In some cases, prospective purchasers of a high-end mattress may not readily understand or appreciate sophisticated product features without a sufficient explanation or demonstration. It can also be difficult to get important points across in the often crowded and harried point-of-sale atmosphere of retail stores. This can be particularly the case with an innovative product, such as the plunger matrix mattress, that is fundamentally or significantly different from the conventional products that customers are familiar with.

Accordingly, there is a need for effective and efficient point-of-sale demonstration systems for innovative plunger matrix mattresses.

SUMMARY

The present disclosure is generally directed to point-of-sale demonstration systems to aid in marketing of plunger matrix mattresses, which include an array of independently movable foam padded plungers visible on the underside of the mattress. The demonstration system includes a display system for viewing the underside of the plunger matrix mattress allowing a person sitting or lying on the mattress to readily view the impression created by their body weight on the plungers. The display system includes a camera positioned to image the underside of the mattress and a monitor (display screen) positioned for viewing by a person lying on the mattress so that they can see the deflection in the bottom of the plungers caused by their own weight on the mattress. Seeing the image of the downwardly displaced plungers immediately conveys the operation of the plunger matrix mattress to the viewer. The system may also be configured to capture individual frames and video images, store the images, transmit the images, and edit as desired, for example by zooming, cropping, changing the speed of the video, and so forth.

The disclosure may be understood more readily by reference to the following detailed description of the various features of the disclosure and the drawings included herein.

BRIEF DESCRIPTION OF THE SEVERAL VIEWS OF THE DRAWINGS

The figures illustrate various embodiments of point-of-sale demonstration systems for mattress, such as plunger matrix mattresses that includes an array of independently movable foam padded plungers visible on the underside of the mattress.

DETAILED DESCRIPTION

Figure 1:
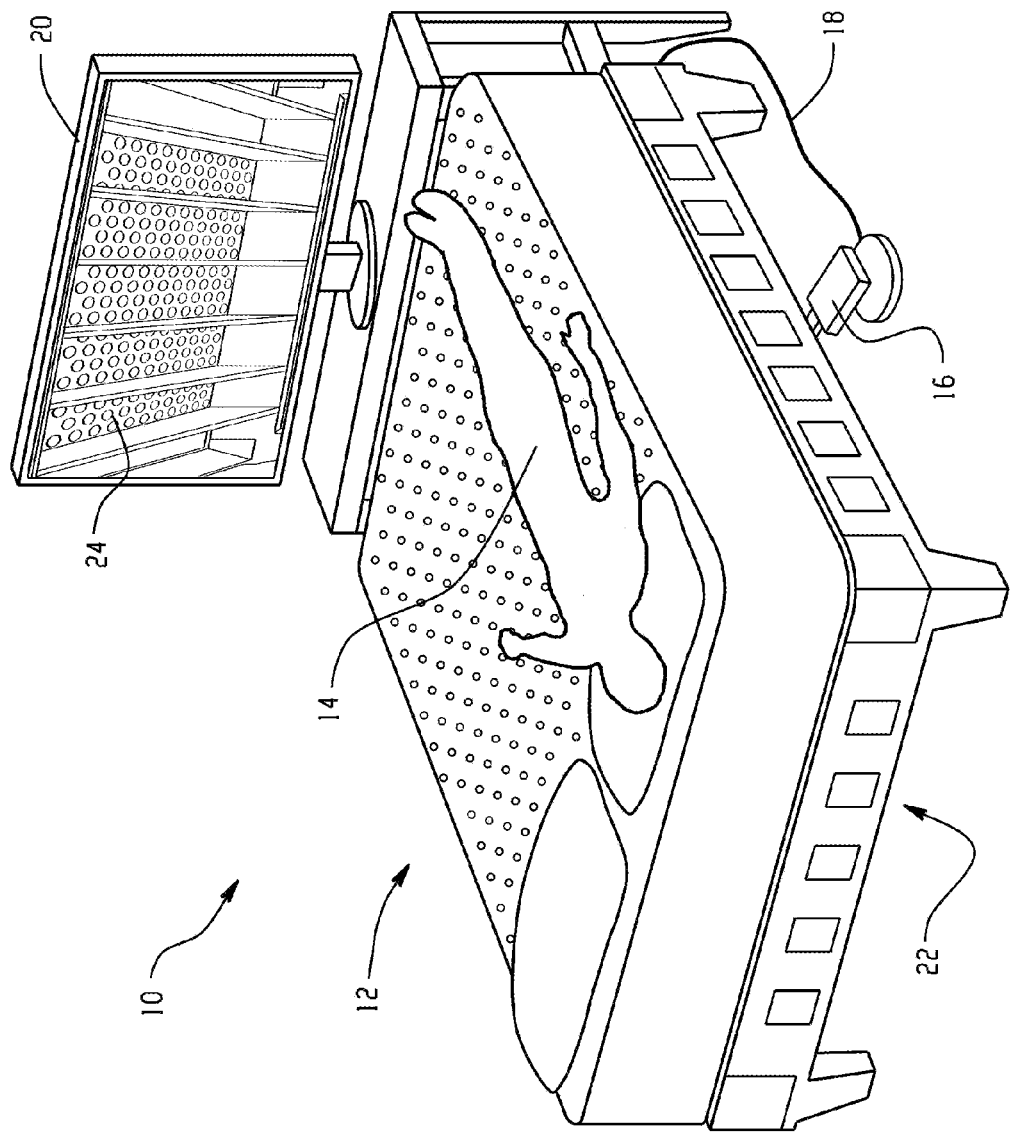
FIG. 1 is a perspective view of a mattress display system for viewing the underside of a plunger matrix mattress.

An embodiment of the invention may be realized in a point-of-sale demonstration system for plunger matrix mattress and a method for demonstrating plunger matrix mattresses, such as those described in commonly-owned U.S. patent application Ser. No. 14/084,859 (Pub. No. US-2014-0137333-A1), which is incorporated by reference. The demonstration system includes a display system including a camera and monitor for viewing the underside of the plunger matrix mattress allowing a person sitting or lying on the mattress to readily view the impression created by their body weight on the plungers. In the illustrative embodiment shown in the figures, the camera is placed on the floor at the edge of the mattress and connected to a display screen by a cable. In alternative embodiments, the camera may be suspended from the bed frame and the camera may communicate wirelessly with the display screen. The system may also be configured to capture individual frames and video images, store the images, transmit the images, and edit as desired, for example by zooming, cropping, changing the speed of the video, and so forth.

Generally described, the plunger matrix mattress includes a matrix of independently movable foam padded plungers, a mattress pad on top of the plungers, a frame, and a rigid plunger support platform supported by the frame. The plungers are individually suspended from the plunger platform and spring loaded to provide an independent point of support. Each plunger includes a pin configured to move up and down within a pin guide that is received within a corresponding aperture through the plunger support platform. A tension spring captured on the pin guide urges the plunger upward while allowing the pin to move downward in response to weight applied to the top of the plunger. An edge frame may surround the plungers or the portions of the plungers extending above the plunger platform to provide additional support at the edges of the mattress. Foam blocks or sections of coil springs may also be included along one or more edges of the mattress to provide additional edge support.

The plunger matrix mattress is distinguishable from conventional coil spring and foam mattresses in that the bottoms of the plungers are deflected downward under a weight bearing object, positioned on the mattress. An impression of the weight bearing object depressing the plungers can therefore be visually observed on the underside of the mattress as an impression formed by the depressed deflected bottoms of the plungers. While it may take some time to explain the operation of the mattress to people who are unfamiliar with the plunger matrix design, showing them the underside of the mattress with the impression formed by the deflected plungers by their own body weight readily and indelibly conveys that information. The information is even more vividly conveyed when the display device show the person on the mattress a video of the underside of the mattress while that person moves around on the mattress so that they can see how their own movement is reflected in changes in the impression created by the bottoms of the plungers.

The display device is primarily intended for use in point-of-sale settings, such as retail stores, where walk-up potential customers can sit or lie down on the mattress while viewing their own impression on the underside of the mattress. An embodiment of the display system includes a video camera positioned to capture an image of at least a portion of the underside of the mattress. The camera transmits the image to a monitor (display screen) using a wired or wireless communication link. The display screen is typically positioned for viewing by the person sitting or lying on the mattress. For example, the monitor may be supported by a wall or stand near the foot of the bed, or it may sit on or be attached to the footboard. The monitor or camera may functionally connected to an associated computer for transmitting, storing and/or editing single images or video obtained from the camera. For example, the computer may be located in the same housing as the camera, in the same housing as monitor, in a separate device such as a mobile phone communicating wirelessly with the camera or the monitor, on a network, or in any other suitable configuration. Similarly, a wireless or hardware (e.g., USB port) may be provided on the camera or the monitor for transmitting the images to another device, such as a mobile phone, where the images may be further edited, stored and transmitted (e.g., with a mobile app conveniently providing this functionality). In this manner, the monitor can provide real time feedback as to movement of the plungers during use by a consumer while allowing the consumer to conveniently share the images with others, such as family members and friends.

FIG. 1 is a perspective view of a mattress display system 10 for viewing the underside of a plunger matrix mattress 12. The system provides a convenient way for a person 14 sitting or lying on the mattress plunger matrix to view and obtain copies of the impression created by displacing plungers with their body weight. The display system 10 includes a camera 16 positioned to image the underside of the mattress 12 connected by a wired or wireless communication link 18 with a monitor 20 or other suitable device including display screen, which is positioned for viewing by the person on the mattress. In this example, the monitor 20 is placed on a footboard, which has a flat top serving as a stand for the monitor. The body weight of the person creates an impression 22 on the underside of the mattress 12 by independently depressing those plungers under the person's body. The display screen 20 shows the image 24 of the underside 22 of the mattress 12 captured by the camera 16 including the impression 26 created by deflection of the bottoms of those plungers depressed by the weight bearing object on the mattress. The camera 16 and/or the monitor 20 may include a computer for storing, processing and transmitting the images captured by the camera. The camera 16 and/or the monitor 20 may also include a wireless or wired communication port, such as a USB port, for export the images to another device, such as a mobile phone, where the images may be further edited, stored and transmitted.

Figure 2:
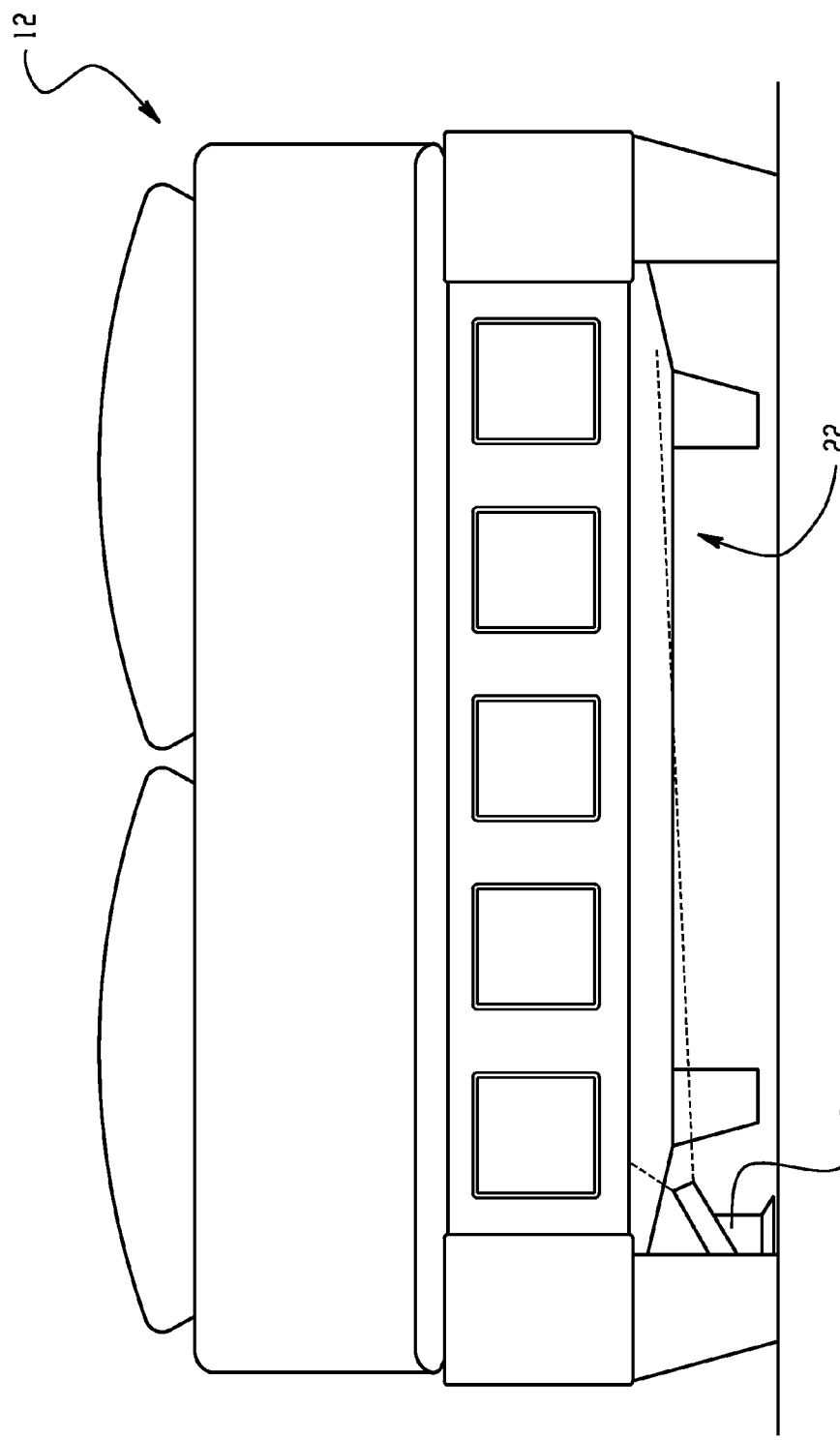
FIG. 2 is an end view of showing the camera viewing the underside of the plunger matrix mattress.
Figure 3:
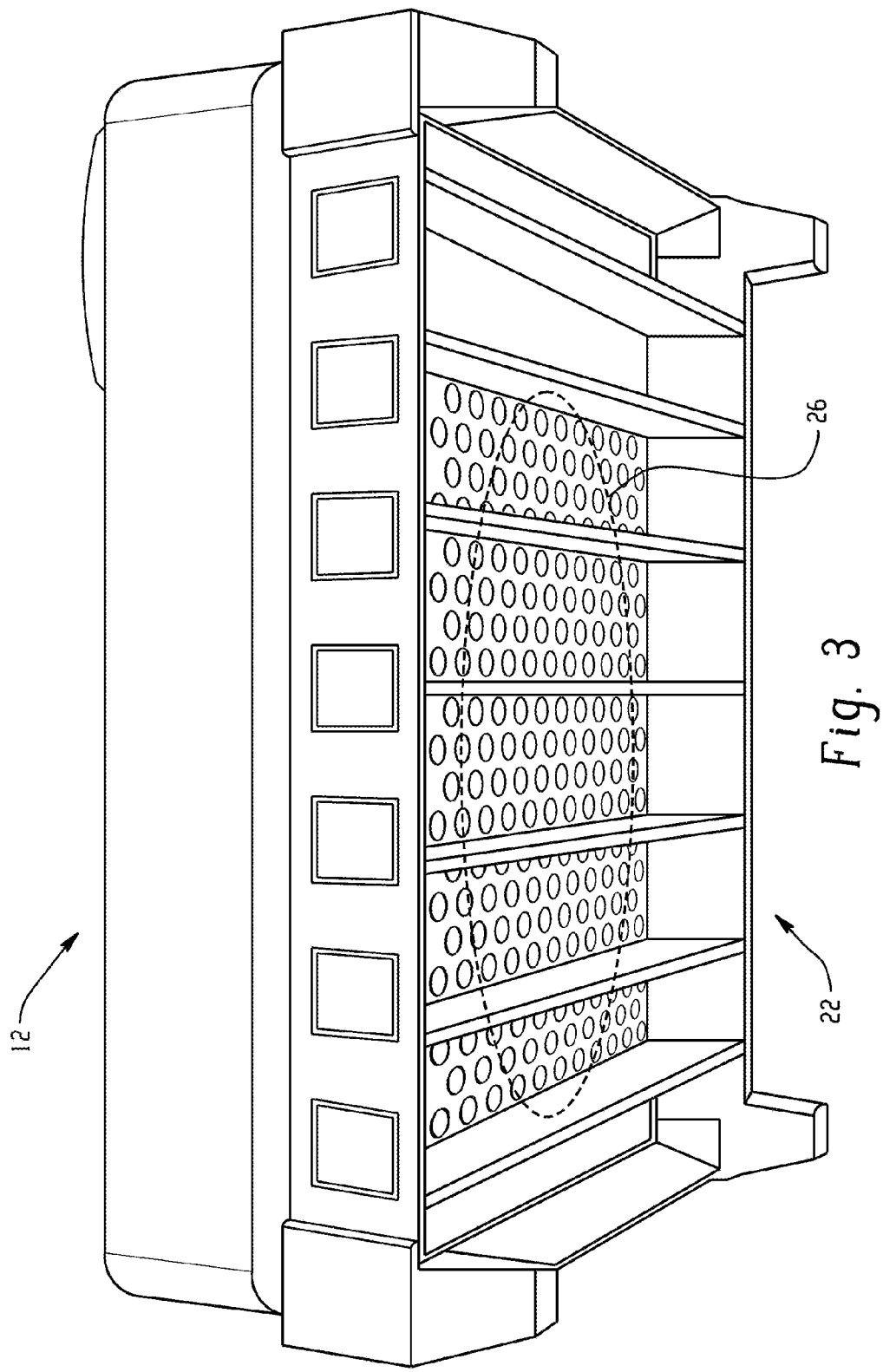
FIG. 3 is a perspective view of the underside of the plunger matrix mattress showing the impression on the underside of the mattress created by deflection of the bottoms of the plungers caused by the weight of a person lying on the mattress.

FIG. 2 is an end view showing the camera 16 viewing the underside of the plunger matrix mattress 12. In this embodiment, the camera is positioned on the floor under a side of the mattress to capture at least a portion of the underside of the mattress 12. The camera is most effectively placed to capture an image of the underside of the portion of the mattress where users are position during normal use of the mattress. In alternative embodiments, the camera may be suspended from or built into the bed frame, for example in a leg of the bedframe. Multiple cameras may also be utilize with the images displayed separately, side-by-side of combined into a unitary image. FIG. 3 is a perspective view of the underside 22 of the plunger matrix mattress 12 showing the impression 26 on the underside of the mattress created by deflection of the bottoms of the plungers caused by the weight of a person lying on the mattress, which is reproduced as a portion of the image 24 on the display screen 20.

The written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or they include equivalent structural elements with insubstantial differences from the literal languages of the claims.

What is claimed is:

1. A display system for displaying at least a portion of an underside of a mattress, the display device comprising:
   a camera capturing images of an underside of a mattress;
   a monitor in communication with the camera displaying the images captured by the camera;
   wherein mattress comprises a matrix of plungers forming an impression of a weight bearing object positioned on the mattress through depression the bottom sides of a portion of the plungers underlying object, wherein the impression is created by a person sitting or lying on the mattress having a vantage point and the monitor is position for viewing from the vantage point of a person sitting or lying on the mattress; and
   the monitor is positioned for viewing the images captured by the camera from a top side of the mattress.

2. The display system of claim 1, further comprising a wired communication link between the camera and the monitor.

3. The display system of claim 1, further comprising a wireless communication link between the camera and the monitor.

4. The display system of claim 1, further comprising a computer configured for transmitting, storing and/or editing single images or video obtained from the camera.

5. The display system of claim 1, further comprising a communication port for exporting the images captured by the camera.

6. The display system of claim 1, wherein the camera is located in a housing separate from the mattress and configured for placement on a floor near the mattress.

7. A point-of-sale demonstration system for a mattress, comprising:
   a demonstration sample plunger matrix mattress;
   a camera positioned capturing images of an underside of the mattress;
   a monitor in communication with the camera configured to display the images captured by the camera;

wherein mattress comprises a matrix of plungers forming an impression of a weight bearing object positioned on the mattress through depression the bottom sides of a portion of the plungers underlying object, wherein the impression is created by a person sitting or lying on the mattress having a vantage point and the monitor is position for viewing from the vantage point of a person sitting or lying on the mattress; and the monitor is positioned for viewing the images captured by the camera from a top side of the mattress.

8. The point-of-sale demonstration system of claim 7, further comprising a wired communication link between the camera and the monitor.

9. The point-of-sale demonstration system of claim 7, further comprising a wireless communication link between the camera and the monitor.

10. The point-of-sale demonstration system of claim 7, further comprising a computer configured for transmitting, storing and/or editing single images or video obtained from the camera.

11. The point-of-sale demonstration system of claim 7, further comprising a communication port for exporting images captured by the camera.

12. The point-of-sale demonstration system of claim 7, wherein the camera is located in a housing separate from the mattress and configured for placement on a floor near the mattress.

13. A method for demonstrating operation of a plunger matrix mattress, comprising:

providing a demonstration sample plunger matrix mattress in a location available to retail shoppers;

positioning a camera to capturing images of an underside of the mattress;

connecting a monitor in communication with the camera configured to display the images captured by the camera;

positioning the monitor is for viewing the images captured by the camera from a vantage point of a person sitting or lying on the mattress; and causing a potential customer to sit or lie on the mattress while viewing the monitor displaying an impression created by the person's body weight through deflection of bottom ends of plungers of the mattress under the body weight of the person.

14. The method of claim 13, further comprising connecting the monitor to the camera via a wired communication link between the camera and the monitor.

15. The method of claim 13, further comprising connecting the monitor to the camera via a wireless communication link between the camera and the monitor.

16. The method of claim 13, further comprising transmitting, storing and/or editing single images or video obtained from the camera.

17. The method of claim 13, further comprising exporting images captured by the camera via a communication port.

18. The method of claim 13, further comprising zooming, cropping, or changing a speed of video captured by the camera.

* * * * *